May 29, 1928.
G. W. PERKS
1,671,161
EXPANSION PIPE JOINT OR COUPLING
Filed May 21, 1927
2 Sheets-Sheet 1
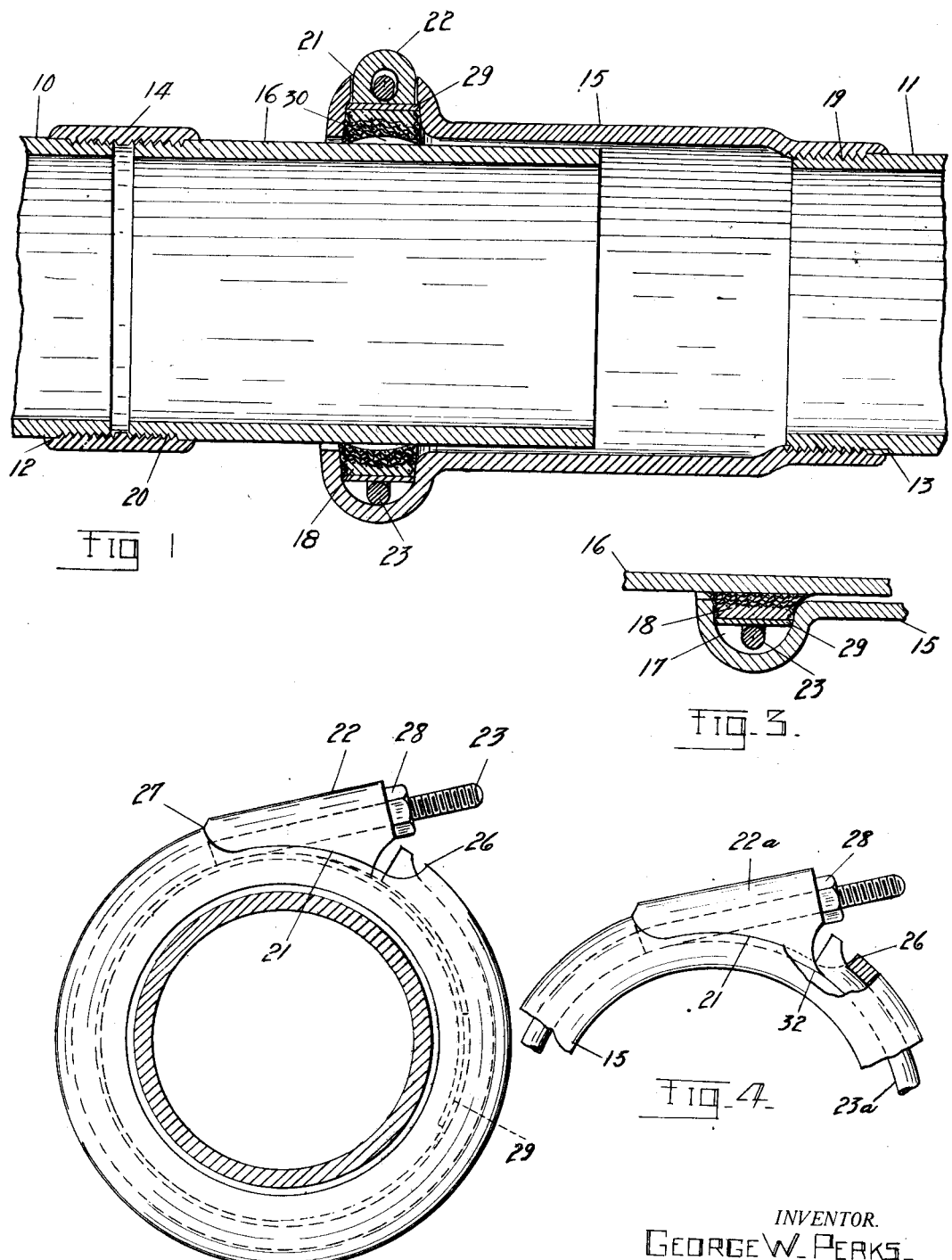
INVENTOR.
GEORGE W. PERKS
BY Ely Barrow
ATTORNEYS.

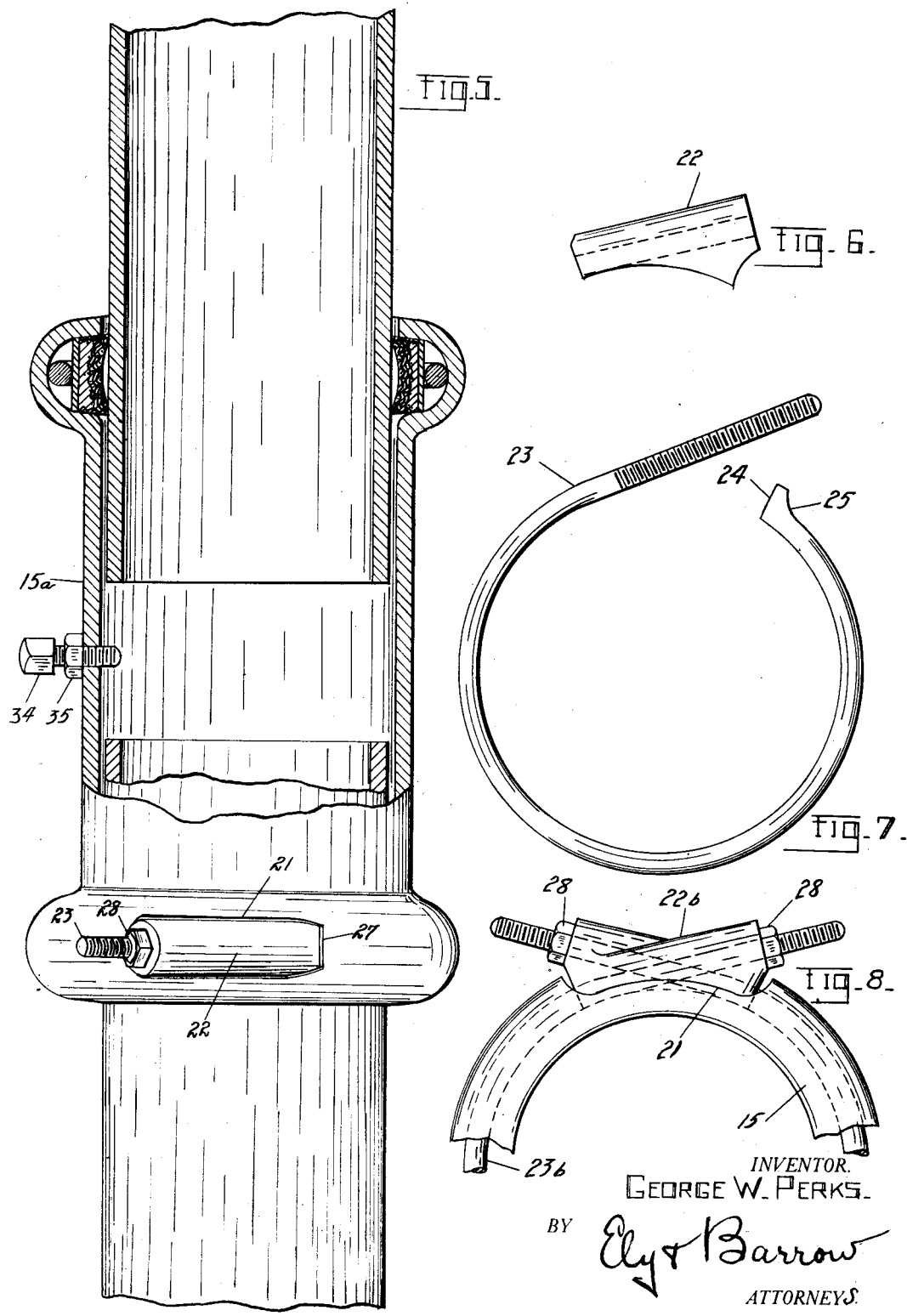

Patented May 29, 1928.

1,671,161

UNITED STATES PATENT OFFICE.

GEORGE W. PERKS, OF AKRON, OHIO.

EXPANSION PIPE JOINT OR COUPLING.

Application filed May 21, 1927. Serial No. 193,167.

This invention relates to pipe joints and has particular reference to an expansion joint, union coupling or accommodation joint comprising means for radially compressing a sealing gasket housed therein.

The general purpose of the invention is to devise a pipe coupling capable of compensating for expansion and contraction, adapted for ready insertion in an existing pipe line or for easy assembly with standard pipe sections, and which comprises a simple and efficient sealing means which can be retightened from time to time with a minimum of labor.

An object of the invention is to provide a joint comprising a pair of telescoped sleeves or nipples preferably having their outer ends screw-threaded for connection with standard pipe, or well casing or tubing, one of the sleeves having a circumferential groove carrying a radially compressible gasket.

A further object is to provide a pipe joint comprising inner and outer telescoped sleeves, the outer sleeve having a circumferential groove carrying a radially compressible gasket and a circular bolt or tightening band adapted to contract the gasket about a pipe end inserted within the sleeve and to spread the gasket transversely to grip the side walls of the groove.

A further object is to provide a preformed packing ring or gasket which may be easily inserted in the groove or grooves of the expansion joint sleeve and which will cooperate with the coupling structure to produce a fluid-tight joint at all degrees of pressure or vacuum within the pipe line when the latter is subjected to intermittent expansion and contraction.

The foregoing and other objects are obtained by the device illustrated in the accompanying drawings and described below. It is to be understood that the invention is not limited to the specific form thereof disclosed herein.

Of the accompanying drawings,

Figure 1 is a longitudinal sectional view taken on the line 1—1 of Figure 2 and illustrating a device embodying the principles of the invention;

Figure 2 is a transverse sectional view thereof, taken on the line 2—2 of Figure 1;

Figure 3 is a detail section illustrating the gasket in sealing position;

Figure 4 is an elevational detail view, partly broken away, illustrating a modified form of the invention;

Figure 5 is a plan view, partly broken away, illustrating another modified embodiment of the invention;

Figure 6 is an elevational detail of an abutment member comprised in the device;

Figure 7 is an elevational detail of a clamping ring or bolt comprised in the device; and Figure 8 is an elevational detail of another modified form of the invention.

Referring more particularly to the drawings, 10 and 11 represent two adjacent sections of a pipe line, each being provided with screw threads 12 and 13, respectively, and section 10 being provided with a threaded coupling collar 14. These sections may be the ends of two existing pipe lines having a variable gap therebetween and which lines are to be coupled by the device of the invention serving as a variable length or accommodation union. Or one of the sections may be an end of a pipe line which is being laid and the other section the next length to be connected thereto. In the latter case a predetermined gap is allowed for the insertion of the device of the invention serving as an expansion joint to compensate for intermittent expansion and contraction in the pipe line.

The coupling comprises outer and inner telescoped sleeves 15 and 16, respectively, the outer sleeve being formed on its telescoped end with a circumferential groove or channel 17 in which packing gasket 18 is to be inserted for sealing the joint. The remote ends of the sleeves are provided with screw threads 19 and 20 to mate with the threads of pipe section 11 and coupling 14, respectively. The walls of groove 17 are cut away to form an elongated opening 21 to accommodate an abutment member 22 (Figure 6) through which is passed the threaded, tangential end of a circular gasket-compressing bolt or band 23 (Figure 7). Bolt 23 is formed with an enlarged head 24 having a tapered surface 25 for wedging against end portion 26 of the groove wall surrounding opening 21 to force the bolt head radially inwardly when the bolt is tightened. The other end 27 of the opening affords a pivot point for the abutment member 22, whereby a bolt 23 is tightened by screwing up on nut 28 threaded thereto, member 22 will swing around the pivot point at 27 so that the inner surface of the member will be forced radially inwardly against the gasket. In order to prevent the bolt from cutting into the gasket and to distribute the pressure of the bolt upon the latter, a strip 29 of non-corrosive metal is interposed therebetween, the strip having its ends in overlapping relation as illustrated in Figure 2.

Gasket 18, molded of a tough, flexible, oil-proof, rubber composition, normally has an arched inner surface 30, as shown in Figure 1, and may be reinforced with a bias-cut fabric 31 of wire, cotton or the like, molded into the gasket in one or more layers. Such bias fabric reinforcement will permit the gasket to be readily inserted in the groove, and radially compressed around the inner sleeve 16, yet will prevent the gasket from being blown out of the joint due to softening cold flow, or misalignment of the pipe sections. The body portion of the gasket is preferably made slightly wider than the groove in which it is to be held, in order to produce an initial, longitudinal compression to seal the outer face of the gasket and to hold the gasket tightly between the walls of the groove to prevent its dislodgement during the insertion of the inner sleeve. The assembly of the joint and insertion of the bolt 23, strip 29 and gasket 18 may be performed in the factory in order to facilitate the connection of the joint with the pipe line in the field. After the bolt and strip have been positioned, the gasket is easily inserted by progressively folding the same around its entire circumference and forcing the folded portion into the groove. The inner sleeve 16, which is preferably coated or plated with brass, copper, zinc or the like to form a smooth, rust-proof surface, is next inserted within the outer sleeve, a split sleeve or plurality of segmental strips (not shown) being employed to spread the gasket while the sleeve is being inserted. After the coupling is assembled into the pipe line, the gasket is tightened by screwing up on the nut 28 as set forth above, causing a radial compression of the gasket entirely about the inner sleeve 16 and, due to the bias fabric reinforcement, also causing a transverse spreading of the gasket against the lateral side walls of groove 17 until the gasket and bolt take the position illustrated in Figure 3.

The expansion joint is connected to the pipe line by inserting it between the ends of the latter in its fully telescoped condition, screwing one sleeve into the adjacent pipe threads, then drawing out the sleeves sufficiently and screwing in the other end. Sufficient clearance is allowed between the outer and inner sleeves of the joint, so that slight angular displacement or misalignment of the pipe line may be taken up by the expansion joint, the sealing of the joint being maintained by the gasket which is free to shift laterally with the inner sleeve.

Figure 4 is a modified form of the gasket compressing means, wherein abutment member $22^a$ is provided with a lip portion 32 adapted to extend under the bolt head, the latter being cut away for this purpose. This construction affords a positive means for forcing the end of member $22^a$ radially inwardly, the assembly of the joint being identical with the first-mentioned form.

Figure 5 is a modified form of coupling for use with threadless butt-joint pipe lines, wherein the coupling sleeve $15^a$ is provided on each end with a packing gasket, duplicating the joint illustrated in Figure 1. The sleeve in this case is provided with a suitable central stop member such as screw 34, for preventing the joint from sliding off either pipe end. This form of expansion coupling sleeve is assembled by sliding the entire sleeve, with screw 34 removed, over one pipe end, aligning the other pipe end, and sliding the sleeve back over the latter. Screw 34 is then inserted and tightened with a locknut 35.

A further modification is shown in Figure 8, wherein the bolt $23^b$ is formed with two threaded tangential ends each of which may be drawn up by a nut 28 acting against double abutment member $22^b$ positioned in opening 21.

An expansion joint or union thus constructed is particularly adapted for use in oil or gas fields, where pipe lines are subjected to varying temperatures causing contraction and expansion thereof and to varying pressures caused by pressure of oil or gas in the well or partial vacuums created by pumps placed in the pipe lines. In being radially compressed around the inner sleeve, the gasket will take up any irregularities in the pipe surfaces and, owing to the fabric reinforcement, will not blow out when used in joints where a maximum of clearance is allowed.

It will be understood that further modifications may be made in the structures herein disclosed without departing from the spirit of the invention or the scope thereof as defined by the appended claims.

What is claimed is:

1. A pipe coupling comprising outer and inner telescoping members, said outer member being formed with an internal, circumferential groove, a resilient gasket positioned in the groove and surrounding the inner member, said gasket being normally transversely wider than said groove to seal against the side walls thereof, an annular band positioned in said groove and encircling said gasket, and means to draw said band circumferentially about the gasket to compress the gasket radially inwardly to seal against the inner member.

2. A pipe coupling comprising outer and inner telescopic members, said outer member being formed with an internal, circumferential groove, a resilient gasket positioned in the groove and surrounding the inner member, a band positioned in the groove about the gasket, and means for drawing the band circumferentially to seal the gasket against said inner member, said gasket and band being free to shift bodily transversely of the pipe or radially in the groove to compensate for any misalignment of the members.

3. A pipe joint comprising outer and inner telescoped members, said outer member being formed with an internal, circumferential channel having a peripheral aperture therein, a gasket positioned in said channel and surrounding the inner member, an annular bolt positioned in said channel and encircling said gasket, one end of said bolt having a head adapted to be wedged against one end of said peripheral aperture and the other end of said bolt being screw-threaded and extending tangentially out of the channel, an abutment member positioned in said aperture in abutting relation against the other end thereof, said tangential end of the bolt extending through said abutment member, and a nut threaded to the bolt for drawing the abutment member and the bolt radially inwardly against the gasket to seal the joint.

4. A pipe joint comprising outer and inner telescoped members, said outer member being formed with an internal, circumferential channel having a peripheral aperture therein, a gasket positioned in said channel and surrounding the inner member, an annular band positioned in said channel and encircling said gasket, an abutment member positioned in said aperture outwardly of said gasket, means for anchoring one end of said bolt with respect to said gasket, the other end being screw-threaded and extending tangentially out of said channel through said abutment member, and a nut threaded to the bolt for drawing the abutment member and the bolt radially inwardly against the gasket to seal the joint.

GEORGE W. PERKS.